US005464082A

United States Patent [19]
Young

[11] Patent Number: 5,464,082
[45] Date of Patent: Nov. 7, 1995

[54] ELECTRICAL VEHICLE TRANSPORTATION SYSTEM

[76] Inventor: Peter Y. S. Young, 2968 Gainsborough Dr., San Marino, Calif. 91108

[21] Appl. No.: 101,042

[22] Filed: Aug. 3, 1993

[51] Int. Cl.$^6$ ............................... B60L 9/00; B60M 1/34
[52] U.S. Cl. ............................. 191/2; 191/23 R; 191/49; 191/56
[58] Field of Search ................. 191/2, 3, 4, 6, 191/8, 14, 15, 17, 18, 22 C, 23 R, 29 R, 33 R, 49, 56; 180/2.1

[56] References Cited

U.S. PATENT DOCUMENTS

| | | | |
|---|---|---|---|
| 895,811 | 8/1908 | Stewart | 191/56 X |
| 907,522 | 12/1908 | Perry | 191/56 |
| 920,427 | 5/1909 | Burkhard | 191/56 |
| 1,364,672 | 1/1921 | Womack | 191/56 X |
| 1,417,350 | 5/1922 | Robinson et al. | 191/56 |
| 1,532,224 | 4/1925 | Blair | 191/56 |
| 1,861,523 | 6/1932 | Clark | 191/49 |
| 1,966,014 | 7/1934 | Kreitz | 191/49 |
| 2,068,403 | 1/1937 | Ekstrom | 191/22 C X |
| 2,125,590 | 8/1938 | Smallwood | 191/22 C X |
| 3,955,657 | 5/1976 | Bossi | 191/2 |
| 4,129,203 | 12/1978 | Berman | 191/4 X |
| 4,139,071 | 2/1979 | Tackett | 191/2 X |
| 4,217,975 | 8/1980 | Barth | 180/2.1 X |
| 4,227,595 | 10/1980 | Hamada | 191/2 |
| 4,476,947 | 10/1984 | Rynbrandt | 180/2.1 |
| 4,800,328 | 1/1989 | Bolger et al. | 191/4 X |
| 5,045,646 | 9/1991 | Musachio | 191/6 |
| 5,134,254 | 7/1992 | Musachio | 191/6 |
| 5,148,898 | 9/1992 | Musachio | 191/6 |

*Primary Examiner*—Michael S. Huppert
*Assistant Examiner*—Scott L. Lowe
*Attorney, Agent, or Firm*—Boniard I. Brown

[57] ABSTRACT

An electrical vehicle transportation system in which a steerable electrically powered automotive vehicle receives electrical power from electrified conductors located above a roadway or affixed to the roadway, through an electrical pickup on the vehicle having electrical contacts engageable with the roadway conductors in a manner which permits steering movement of the vehicle laterally of the roadway and switching of the vehicle from one traffic lane to another with no interruption, or only momentary interruption, in the flow of electrical power to the vehicle. An electrically powered vehicle and electrical pickup for the transportation system.

20 Claims, 5 Drawing Sheets

ELECTRICAL VEHICLE TRANSPORTATION SYSTEM

BACKGROUND OF THE INVENTION

1. Field of the Invention

This invention relates generally to transportation systems and more particularly to an improved electrified vehicle transportation system wherein the vehicles receive electrical power through electrical conductors on or above the roadway. The invention also provides novel electrical pickups to be mounted on the vehicles for transferring electrical power from the roadway conductors to the vehicles.

2. Prior Art

A variety of electrified vehicle transportation systems have been devised over the years, and some have been placed into actual operation for public use. One well-known type of electrified vehicle transportation system, for example, comprises electrically powered public transportation vehicles, such as the "street cars" of past years, subway trains, and electrified surface trains, which run on fixed rails and receive electrical power through electrical pickups engaging either overhead electrical cables or so-called "third rails". Another type of electrified public transportation system in current widespread use comprises steerable wheeled vehicles in the form of rubber-tired busses which run on public roadways and receive electrical power through overhead electrical cables. While this latter type of electrified transportation system, i.e., a system utilizing steerable wheeled vehicles which run on public roadways, are in current use only for public transportation and for other specialized commercial applications, the system is quite adaptable to use with electrified automobiles and such use has been proposed in the past.

Among the prior art patents in the field of electrified vehicle systems are the following: U.S. Pat. Nos. 2,068,403 and 2,125,590, relating to electrified toy car systems; U.S. Pat. Nos. 1,532,224 and 1,966,014 relating to overhead and third rail electrical pickups for electrified vehicle systems, and U.S. Pat. No. 5,134,254 relating to an electrified, steerable vehicle transportation system for use on public roadways.

SUMMARY OF THE INVENTION

According to one of its aspects, this invention provides an improved electrified vehicle transportation system of the class described comprising steerable wheeled vehicles which run on electrified public roadways and receive electrical power through electrical pickups on the vehicles engaging electrical conductors fixed in the roadways or located above the roadways. Another aspect of the invention is concerned with improved electrical pickups for the vehicles. The vehicles may be either automobiles or larger public transportation vehicles, i.e., busses. The electrical pickups on the vehicles include electrical contacts which engage and are movable with the vehicles along the roadway conductors to provide electrical power transmission circuits between the conductors and vehicles.

The vehicles may be powered by any type of propulsion system which requires electrical power for propulsion purposes. This invention is not concerned with the details of the propulsion system. The vehicles may be powered by electrical propulsion motors energized by on-board storage batteries which are continuously charged from the roadway conductors. Accordingly, the battery charge of a vehicle is maintained or increased rather than depleted while the vehicles are traveling on electrified roadways, whereby the battery charge is preserved for travel on non-electrified roadways.

According to one feature of the invention, the contacts on the vehicle pickups and the roadway conductors are uniquely constructed and arranged to permit limited movement of the pickup contacts laterally of the roadway conductors while the contacts remain in full electrical engagement with the conductors in such a way as to permit limited steering movement of the vehicles laterally of the roadways and roadway conductors without any interruption of the electrical power transmission between the vehicles and the conductors. The vehicle pickups of certain disclosed embodiments are constructed and arranged to permit both limited lateral vehicle movement without any interruption of the power transmission to the vehicles and greater lateral movement of the vehicles with only momentary interruption of the electrical power transmission. According to another feature of the invention, the vehicle pickup contacts and roadway conductors are shaped to facilitate lateral movement of the contacts onto the conductors. In the disclosed embodiments of the invention, for example, the roadway has conductors arranged in a number of traffic lanes, and the vehicles are movable from one traffic lane to another with only momentary interruption of the electrical power transmission between the vehicles and the roadway conductors.

Several presently preferred embodiments of the vehicle transportation system and electrical pickups are described. In certain embodiments, the roadway conductors are rails which project a small distance above the roadway surface, and the vehicle pickup contacts are rotary cylindrical contacts which are elongated laterally of the vehicles so as to be movable endwise back and forth across the rails, within certain limits, while remaining in full electrical contact with the rails so as to permit limited steering movement of the vehicles laterally of the roadway and the rails. The ends of these cylindrical contacts are tapered or otherwise shaped to facilitate endwise movement of the contacts onto the rails, laterally of the rails, and thereby permit movement of a vehicle from a non-electrified roadway onto an electrified roadway and switching of a vehicle from the rails in one traffic lane to the rails in another traffic lane. The rotary cylindrical contacts in some disclosed embodiments have raised tire-like portions which ride on the surfaces of non-electrified roadways. In one disclosed embodiment, the contacts are mounted on a wheeled carriage attached to the vehicle.

In other disclosed embodiments, the roadway conductors are fixed within upwardly opening channels in the roadways; each conductor has opposing, laterally spaced portions extending along the sidewalls of its respective channel. The vehicle pickup contacts have a generally ball-like spherical shape. These contacts engage between and ride on the opposing portions of their respective conductors in such a way that the contacts are capable of limited movement with the vehicle laterally of the roadway and its conductors, while remaining in electrical contact with one of their respective opposing contact portions so as to maintain uninterrupted electrical power transmission to the vehicles. The contacts are readily movable in and out of the channels during movement of the vehicles laterally across the channels. Certain of the disclosed pickups have multiple pairs of ball-type contacts which are spaced laterally of the vehicle in such a way that during movement of a vehicle across a pair of roadway channels, the pairs of contacts enter the channels successively and engage the channel conductors so as to permit increased lateral steering movement of the vehicle, with only momentary interruption of the electrical power transmission to the vehicle.

DESCRIPTION OF THE PREFERRED EMBODIMENTS

Figure 1:
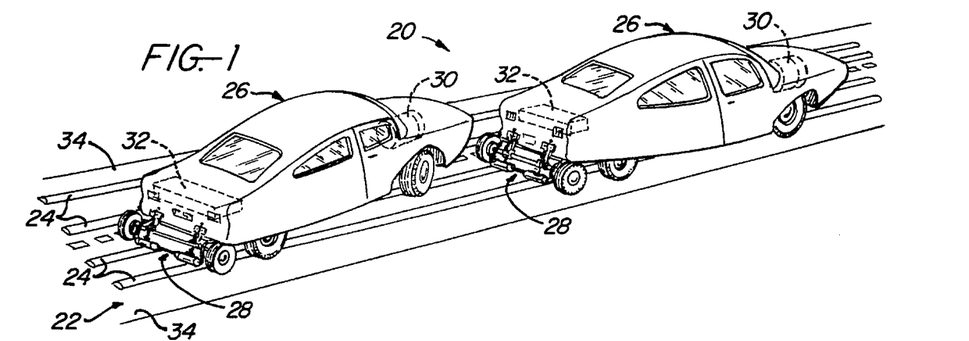
FIG. 1 illustrates an electrified vehicle transportation system according to the invention.
Figure 2:
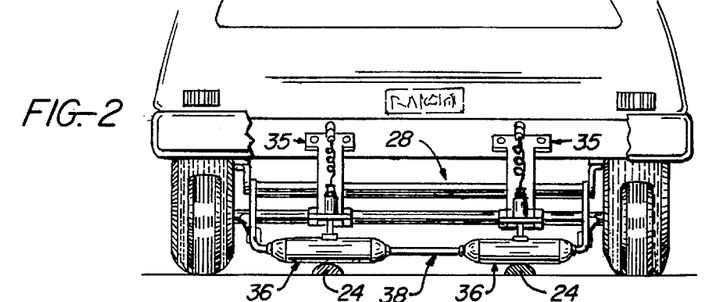
FIG. 2 is an enlarged rear end view of one of the vehicles in FIG. 1 illustrating the electrical pickup on the vehicle.
Figure 3:
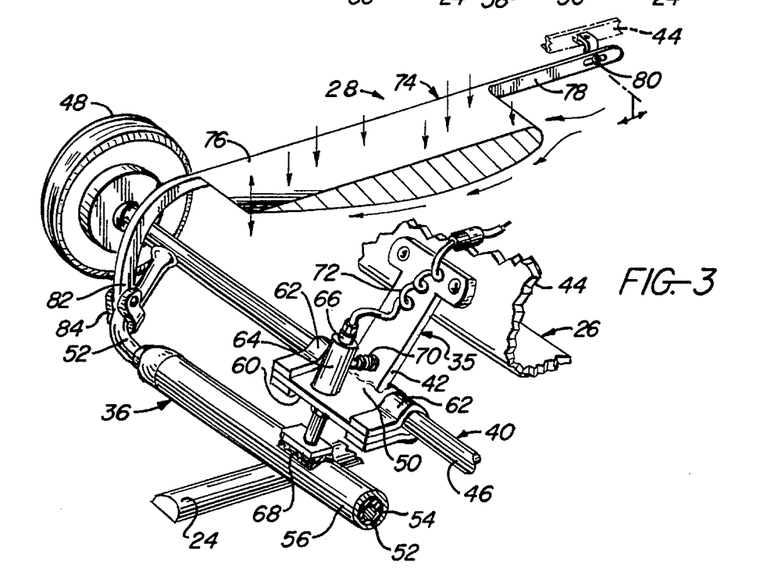
FIG. 3 is an enlarged fragmentary perspective view of the pickup in FIG. 2.

Referring to the drawings and first to FIGS. 1–3, the illustrated electrified vehicle transportation system 20 comprises a roadway 22 having electrical conductors 24 fixed to and extending along the roadway, and electrified steerable vehicles 26 having ground wheels which ride on the roadway surface. The vehicles are movable along and laterally of the roadway and include electrical pickups 28 engageable with the roadway conductors 24. The conductors 24 are energized from a conventional electrical power generating station, not shown, and comprise two conductors of positive and negative electrical polarity, respectively. The pickup 28 on each vehicle provides an electrical circuit between the vehicle and roadway conductors 24 for transmitting electrical power between the conductors and the vehicle.

As mentioned earlier, the electrified vehicles 26 may comprise automobiles, as shown, or larger vehicles, such as large recreational vehicles, busses or the like. Also, the vehicles may have various types of electrical propulsion systems. For convenience, it is assumed that the vehicles are battery powered vehicles including electrical propulsion motors 30 energized by storage batteries 32 through appropriate driver operated controls, not shown. The vehicles also include other standard vehicle operating elements, such as steering wheels, brakes, lights, and the like, not shown. During travel of a vehicle 26 on an electrified roadway 22, the stored electrical energy in the vehicle batteries 32 is utilized to power the vehicle motor 30 while the batteries are being continuously recharged from the roadway conductors 24. Thus, the net battery charge is not consumed while traveling on an electrified roadway, but, instead, the batteries are maintained at or near full charge for travel on non-electrified roadways. The illustrated roadway 22 has multiple traffic lanes 34 arranged side by side in the customary manner and a pair of conductors 24 in each lane.

Electrical pickup 28 includes mounting means 35 for attachment to the vehicle 28, a pair of electrical contacts 36 and means 38 supporting the contacts on the mounting means 35. The contacts 36 are engageable with the conductors 24, respectively, in each traffic lane 34 and are movable along the conductors with the vehicle 28. According to a feature of the invention, the conductors 24 and contacts 36 are shaped and arranged to permit limited movement of the contacts with the vehicle laterally of the conductors while the contacts remain in full electrical engagement with the conductors so as to enable limited steering movement of the vehicle laterally of the roadway without any interruption in the electrical power transmission to the vehicle. The contacts and conductors are also shaped to facilitate movement of the contacts onto the conductors when the vehicle enters the roadway or switches from one traffic lane 34 to the other, as discussed below.

In the particular inventive embodiment illustrated in FIGS. 1–3, the roadway conductors 24 comprise rails which are fixed in and project above the roadway surface. The contact supporting means 38 comprises a wheeled carriage 40. The pickup mounting means 35 comprises a pair of leaf springs 42 attached to and extending downwardly and rearwardly from the vehicle frame 44 at the rear of the vehicle 26. The carriage 40 includes a shaft or axle 46 extending transversely of the vehicle and rotatably mounting ground wheels 48 at its ends. This shaft is journalled between its ends in bearing sleeves 50 rigidly attached to the lower ends of the leaf springs 42 and is restrained against axial movement relative to the bearing sleeves in any convenient manner. Laterally spaced from and parallel to the axle 46 is a contact support shaft 52 whose ends turn toward and are rigidly joined to the axle adjacent the wheels 48. The contacts 36 comprise rotary cylindrical contacts or contact rollers rotatable on the support shaft 52. Each contact roller includes an inner electrical insulating sleeve 54 rotatable on and restrained against movement along the shaft 52 and an outer metal contact sleeve 56 about and fixed to the insulating sleeve. The axle 46 is sized in length and positioned axially and the contact rollers 36 are positioned along the support shaft 52 so that when the vehicle 26 centrally straddles a pair of roadway conductor rails 24, the carriage wheels 48 also centrally straddle the rails, and the centers of the contact rollers 36 engage the rails.

The electrical pickup 28 includes a pair of carbon brush assemblies 68 associated with the contact rollers 36, respectively. Each brush assembly includes a plate 60 whose ends are positioned between and rigidly joined to the ends of a pair of U-shaped bearing straps 62 which encircle the axle 46 and rotatably journal the plate on the axle with the plate disposed in a plane containing the axle axis. The two bearing straps of each brush assembly straddle one of the axle bearing sleeves 50. Extending through and rigidly joined to the plate 60 is an electrical insulating sleeve 64 in which is fixed a rod 66 mounting a carbon brush 68 at its lower end. This brush has a concave cylindrical face which bears slidably against the outer metal sleeve 56 of the respective contact roller 36 and is urged into contact with the sleeve by a spring 70 which urges the brush assembly counter-clockwise in FIG. 3 about the axis of the axle 46. Attached to the upper end of the rod 66 is an electrical lead 72 which connects to the electrical circuitry in the vehicle. The contact rollers 36, brush assemblies 68, and leads 72 provide electrical paths through which electrical current flows between the vehicle and the roadway rails 24.

It will be understood at this point that during movement of the vehicle 26 along the roadway 22 in one of the traffic lanes 34, the wheels 48 of the pickup carriage 40 ride on the roadway surface at opposite sides of the respective conductor rails 24, and contact rollers 36 ride along the elevated upper surfaces of the rails to conduct electrical power from the rails to the vehicle. The leaf springs 42 urge the carriage downwardly and support the carriage on the vehicle for up and down movement relative to the vehicle. The contact rollers are maintained in good electrical contact with their rails by the downward bias of the leaf springs, the weight of the contact rollers and their supporting shaft 52, and the force of the spring 70 which urges the carbon brushes 68 downwardly against the contact rollers.

In some cases, it may be desirable or necessary to increase the force holding the contact rollers 36 against the rails 24. This increased force may be provided in various ways. The particular vehicles 26 illustrated are equipped with aerodynamic means 74 for providing such increased force. This aerodynamic means comprises an inverted airfoil 76 extending laterally of the vehicle over which air flows during movement of the vehicle. Attached to the ends of the airfoil are support arms 78 (only one shown) which extend forwardly from the airfoil and are attached at their front ends to the vehicle frame 44 by pivot connections 80 (only one shown) which permit up and down pivotal movement of the arms and limited endwise movement of the arms. Also attached to the ends of the airfoil are arms 82 which extend rearwardly and downwardly from the airfoil and are attached at their rear ends to the ends of the contact roller support shaft 52 by pivotal connections 84. During movement of the vehicle 26, airflow over the airfoil 76 creates a downward force on the airfoil tending to rotate it downwardly about the front pivot connections 80 and thereby exert a downward force on the contact rollers 36.

It will be observed that the contact rollers 36 are elongated laterally of the vehicle 26 to a length substantially greater than the width of the conductor rails 24. As a result, the contacts are movable endwise back and forth a substantial distance across their rails while remaining in full electrical contact with the rails. This permits limited steering movement of the vehicle laterally of the roadway 22 without separating the contact rollers from their rails and hence without interrupting the electrical circuit between the roadway and the rails. When the vehicle changes lanes, of course, the contact rollers momentarily separate from the rails and thereby cause momentary interruption in the vehicle/rail circuit. During this interruption, the vehicle motor 30 continues to be energized from the vehicle batteries 32. The rails in adjacent lanes are separated sufficiently to preclude the possibility of one contact roller engaging one rail in one lane and one lane in the adjacent lane when changing lanes. During travel of the vehicle along the roadway, therefore, the vehicle batteries are continuously charged from the roadway conductor rails to permit travel of the vehicle substantial distances along non-electrified roadways.

Figure 4:
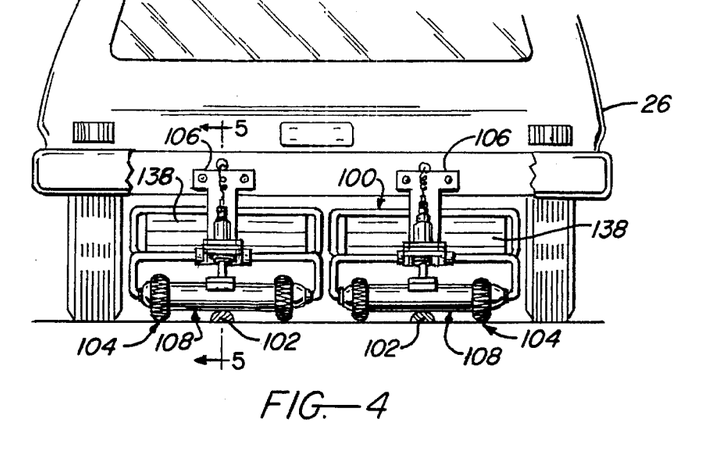
FIG. 4 is a rear end view of an electrified vehicle having a pair of modified electrical pickups according to the invention.
Figures 5, 6, 7, 8:
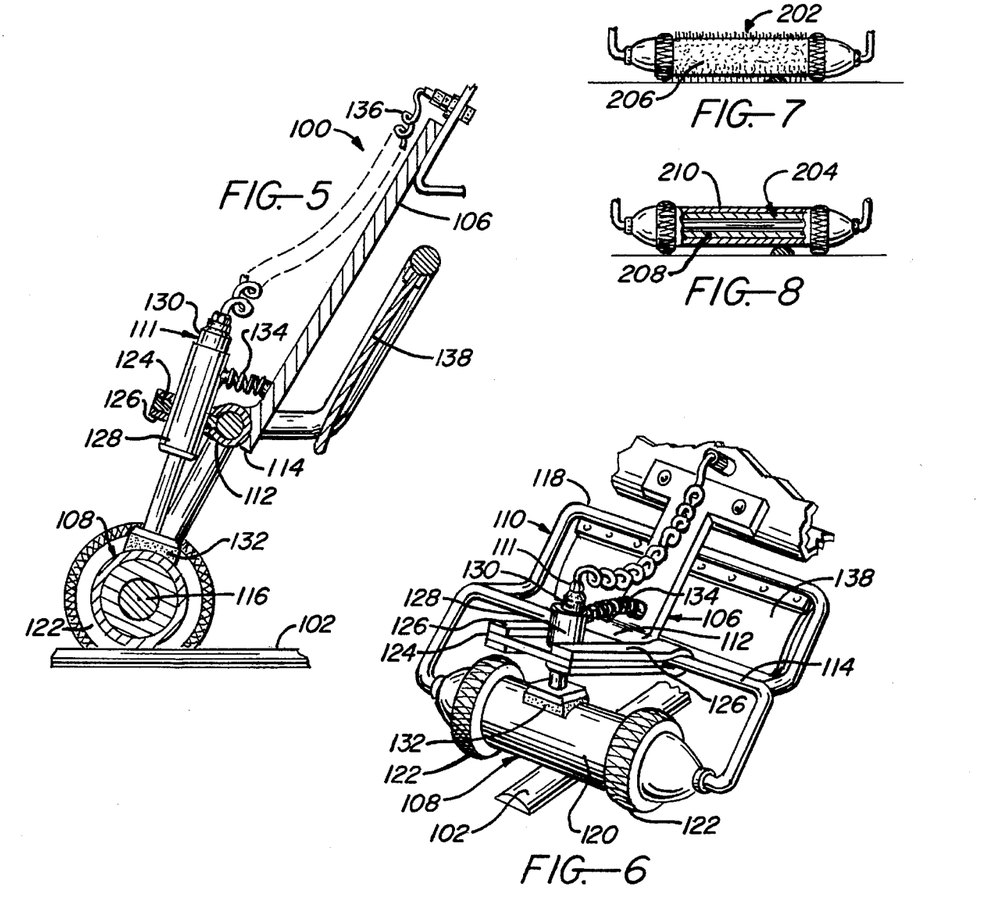
FIG. 5 is an enlarged section taken on line 5—5 in FIG. 4.
FIG. 6 is an enlarged fragmentary perspective view of one of the electrical pickups in FIG. 4.
FIGS. 7 and 8 illustrate modified electrical contacts which may be used on the pickups of FIGS. 1–6.

Turning now to FIGS. 4–6, there is illustrated an electrified vehicle 26 having a modified electrical pickup means 100 according to the invention for engaging the roadway conductors 102, in this case conductor rails like those in FIGS. 1–3. The modified pickup means 100 includes two separate electrical pickups 104 spaced laterally of the vehicle. Each pickup 104 includes mounting means 106 attached to the vehicle, an electrical contact 108, contact support means 110 supporting the contact on the mounting means, and a carbon brush assembly 111. The mounting means 106 comprises a spring bracket in the form of a leaf spring which extends downwardly and rearwardly from the vehicle frame and is rigidly attached at its upper end to the frame. Rigid on the lower end of the leaf spring is a bearing sleeve 112. The contact support means 110 comprises an open frame including three parallel, laterally spaced shaft portions or shafts 114, 116, 118. The center vehicle frame shaft 114 is journalled in and fixed against axial movement relative to the leaf spring bearing sleeve 112.

The pickup contact 108 is a cylindrical contact roller rotatably journalled on and fixed against axial movement along the lower frame shaft 116. This contact roller is similar to that of FIGS. 1–3 and has an outer metallic sleeve 120 which is electrically insulated from the lower frame shaft. Surrounding the ends of the contact roller 108 are tire-like portions 122 which may be constructed of rubber or other resilient material. The radial height of these "tires" above the contact roller sleeve 120 is such as to permit good electrical contact between the sleeve and its roadway rail 102 when the roller is positioned over the rail as in FIG. 4. When the vehicle is travelling on a non-electrified roadway, the tires 122 ride on the roadway surface so as to elevate the contact sleeve 120 above the surface.

The carbon brush assembly 111 is similar to that in FIGS. 1–3 and includes a plate 124 whose ends are positioned between and rigidly joined to the ends of a pair of U-shaped bearing straps 128 which encircle the center frame shaft 114 and rotatably journal the plate on the shaft with the plate disposed in a plane containing the shaft axis. The two bearing straps of each brush assembly straddle bearing sleeve 112 in which the shaft 114 is journalled. Extending through and rigidly joined to the plate 124 is an electrical insulating sleeve 128 in which is fixed a rod 130 mounting a carbon brush 132 at its lower end. This brush has a concave cylindrical face which bears slidably against the outer metal sleeve 120 of the contact roller 108. The brush is urged downwardly against the contact roller sleeve by a spring 134 which urges the brush assembly counter-clockwise in FIG. 8 about the shaft 114. Attached to the upper end of the rod 130 is an electrical lead 138 which connects to the electrical circuitry in the vehicle.

The two pickups 104 are spaced laterally of the vehicle 26 in such a way that when the vehicle is centered over the roadway rails 102, the contact rollers 108 are centered over and engage their respective rails. The contact rollers, carbon brush assemblies 111, and leads 136 then provide electrical paths through which electrical current flows between the vehicle and the roadway rails to charge the vehicle batteries (not shown in FIG. 4). The contact rollers 108 are maintained in good electrical contact with the rails 102 by the brush assembly springs 134 which urge the rollers downwardly against the rails. The particular pickups 104 illustrated have aerodynamic means 138 for aiding this function of the springs 134. These aerodynamic means comprise curved vanes which are rigidly attached to the upper frame shafts 118 and against which air impacts during forward movement of the vehicle 26. Impact of air against these vanes produces counter-clockwise moments on the pickup frames 110 about the center frame shafts 114 which aid the springs 134 in holding the contact rollers 108 against the rails 102. The electrical pickups of FIGS. 4–6 obviously possess all of the features and advantages mentioned earlier in connection with FIGS. 1–3.

FIGS. 7 and 8 illustrate modified contact rollers 202 and 204 which may be utilized in the electrical pickups of FIGS. 1–6. The contact roller 202 in FIG. 7 is like that in FIG. 4 except that the metallic sleeve 206 of the roller has a fuzzy metallic surface. The contact 204 in FIG. 8 is like that in FIGS. 1–6 except that the roller 204 has a plastic body 208 surrounded by a metal sleeve 210.

Figures 9, 10:
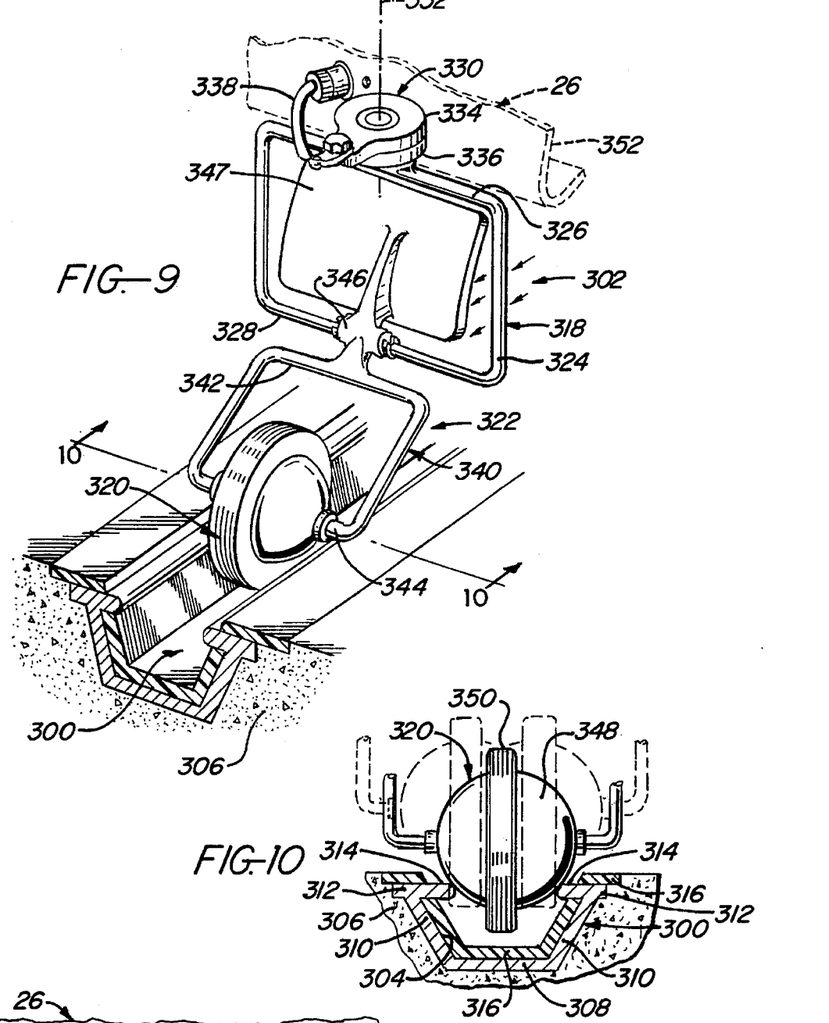
FIG. 9 is a perspective view of a further modified electrical pickup according to the invention.
FIG. 10 is a section taken on line 10—10 in FIG. 9.

FIGS. 9 and 10 illustrate a modified roadway conductor 300 and a modified electrical pickup 302 for an electrified vehicle transportation system according to the invention. While only one conductor and one pickup are shown, it will be understood that an actual electrified transportation system will include a pair of conductors 300 within each roadway traffic lane and a pair of pickups 302 on each electrified vehicle 26 (only the vehicle frame shown). The roadway conductor 300 is fixed within an upwardly opening roadway channel 304 having upwardly divergent sides. The conductor 300 comprises a metal channel including a bottom wall 308, upwardly divergent side walls 310, and outwardly divergent coplanar flanges 312 along the upper longitudinal edges of the side walls. Integrally formed on the inner sides of the side walls 310 are inwardly projecting portions 314 which are spaced laterally of and extend lengthwise along the conductor. The conductor is shaped in transverse cross-section to fit within the roadway channel 304 with the bottom wall 308 and side walls 310 of the conductor seating against the bottom and sides of the roadway channel and with the conductor flanges 312 recessed into the surface of roadway 306. The conductor is fixed within the roadway channel in any convenient way. The inner surfaces of the conductor walls 308, 310 and the upper surfaces of the conductor flanges 312 are covered by a protective insulating layer 316 through which the conductor portions 314 protrude so as to be exposed in spaced opposing relation within the roadway channel, as shown.

The pickup 302 includes mounting means 318 for attachment to the electrified vehicle 26, an electrical contact 320 for engaging the roadway conductor 300, and contact support means 322 supporting the contact on the mounting means. Mounting means 318 comprises an open rectangular frame 324 having upper and lower normally horizontal rod portions 326, 328. Mounted on the upper side of the upper rod portion 326 at its center is a rotary coupling 330 having a normally vertical rotation axis 332 normal to and intersecting the longitudinal axes of the rod portions 326, 328. This rotary coupling includes a lower coaxial disc 336 rigid on the upper rod portion and an upper coaxial disc 334 rotatably coupled to the lower disc for rotation on the axis 332. Connected to the upper disc 334 is an electrical lead 338.

The contact support means 322 includes a lower open rectangular frame 340 having upper and lower normally horizontal rod portions 342, 344. Rigid on and extending outwardly from the center of the upper rod portion 342 is a boss including a bearing sleeve 346 whose axis is parallel to and spaced outwardly from the upper rod portion. Bearing sleeve 346 is rotatable on the lower rod portion 328 of the mounting frame 324 at its center and is fixed against axial movement along the lower rod portion. An aerodynamic vane 347 is fixed to and located above the bearing sleeve 346.

The contact 320 has a spherical metal body or ball 348 coaxially rotatable on and fixed against axial movement along the lower rod portion 344 of the contact support frame 340. Coaxially surrounding the contact ball 348 is a resilient tire 350. The contact ball is sized to engage within the roadway conductor between its opposing portions 314 and to ride on these opposing portions, in the manner illustrated in FIG. 10.

As noted above, each traffic lane of an electrified roadway can have two of the roadway conductors 300, and each electrified vehicle will mount two of the electrical pickups 302 side by side laterally of the vehicle (in the same manner as the pickups in FIG. 11 described below). The upper disc 334 of the rotary coupling 330 of each pickup is rigidly attached to the frame 352 of the electrified vehicle 26 with the coupling rotation axis 332 normally vertical, as shown in FIG. 9. The two pickups are spaced laterally of the vehicle so that when the vehicle is traveling along the roadway 306 in centered relation over a pair of roadway conductors 300, the contact ball 348 of each pickup will ride along the respective opposing conductor portions 314, in the manner illustrated in FIG. 10. The several parts of each pickup are disposed in electrical engagement with one another so that an electrical circuit is then established between the respective conductor and the electrified vehicle circuitry through the contact ball 348, the lower contact support frame 340 and bearing 346, the upper mounting frame 318 and coupling 330, and the electrical lead 338. These pickup circuits are electrically insulated in any convenient way from the vehicle frame. As the vehicle travels along the roadway, the contact 320 of each pickup is held in good electrical engagement with its roadway conductor 300 by the combined weight of the contact and its support frame 340 and the impact of air against its pickup vane 347. The vehicle batteries (not shown) are thereby charged from the roadway conductors as the vehicle travels along the roadway, as in the earlier described embodiments of the invention.

The rotary coupling 330 of each pickup permits some small lateral steering movement of the vehicle while the pickup contact continues to track within its roadway conductor 300. Moreover, as illustrated by the solid and broken lines in FIG. 10, each contact 320 is capable of limited lateral movement relative to its roadway conductor 300 while remaining in good electrical engagement with the conductor to accommodate limited lateral steering movement of the vehicle. Greater lateral steering movement of the vehicle will cause each pickup contact to ride laterally out of its roadway conductor and, when changing lanes, into the next conductor which the contact encounters. As mentioned earlier, the roadway conductors in adjacent traffic lanes will be spaced to prevent engagement on vehicle contacts with conductors in two adjacent lanes. When changing lanes or travelling on non-electrified roadways, the pickup contacts will roll on their tires 350.

Figure 11:
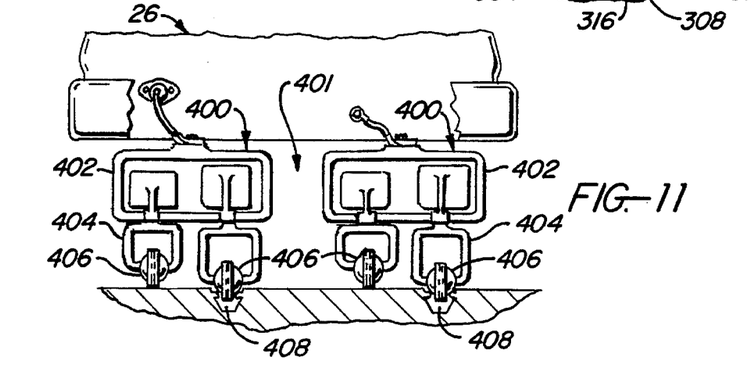
FIG. 11 illustrates a further modified pickup according to the invention.

The modified electrified transportation system of FIG. 11 is identical to that of FIGS. 9 and 10 except for the following differences. The electrical pickup means 400 on each electrified vehicle 26 comprises a pair of pickups 401, each having a mounting frame 402 rotatably attached to the vehicle 26. Each mounting frame pivotally supports a pair of contact support frames 404 mounting rotary ball-like contacts 406. In this embodiment, the pickup means 400 includes two pairs of contacts 406, each including one contact from one pickup 401 and one contact from the other pickup 401. The contacts of each of these contact pairs are spaced laterally of the vehicle 26 for engagement with a pair of roadway conductors 408. In FIG. 11, one of these contact pairs comprises the contacts which are engaged within the roadway conductors 408. The other contact pair comprises the contacts which ride on the roadway surface. During right hand lateral steering movement of the vehicle from the position of FIG. 11, the contact pair within the roadway conductors 408 will ride out of the conductors and the other pair of conductors will ride into the conductors. The reverse action will occur during subsequent left hand steering movement of the vehicle back to its position of FIG. 11. This pickup arrangement effectively increases the limits of lateral steering movement of the vehicle within a given traffic lane with only momentary interruption of the charging circuit between the vehicle and the roadway conductors.

Figures 12, 13, 14:
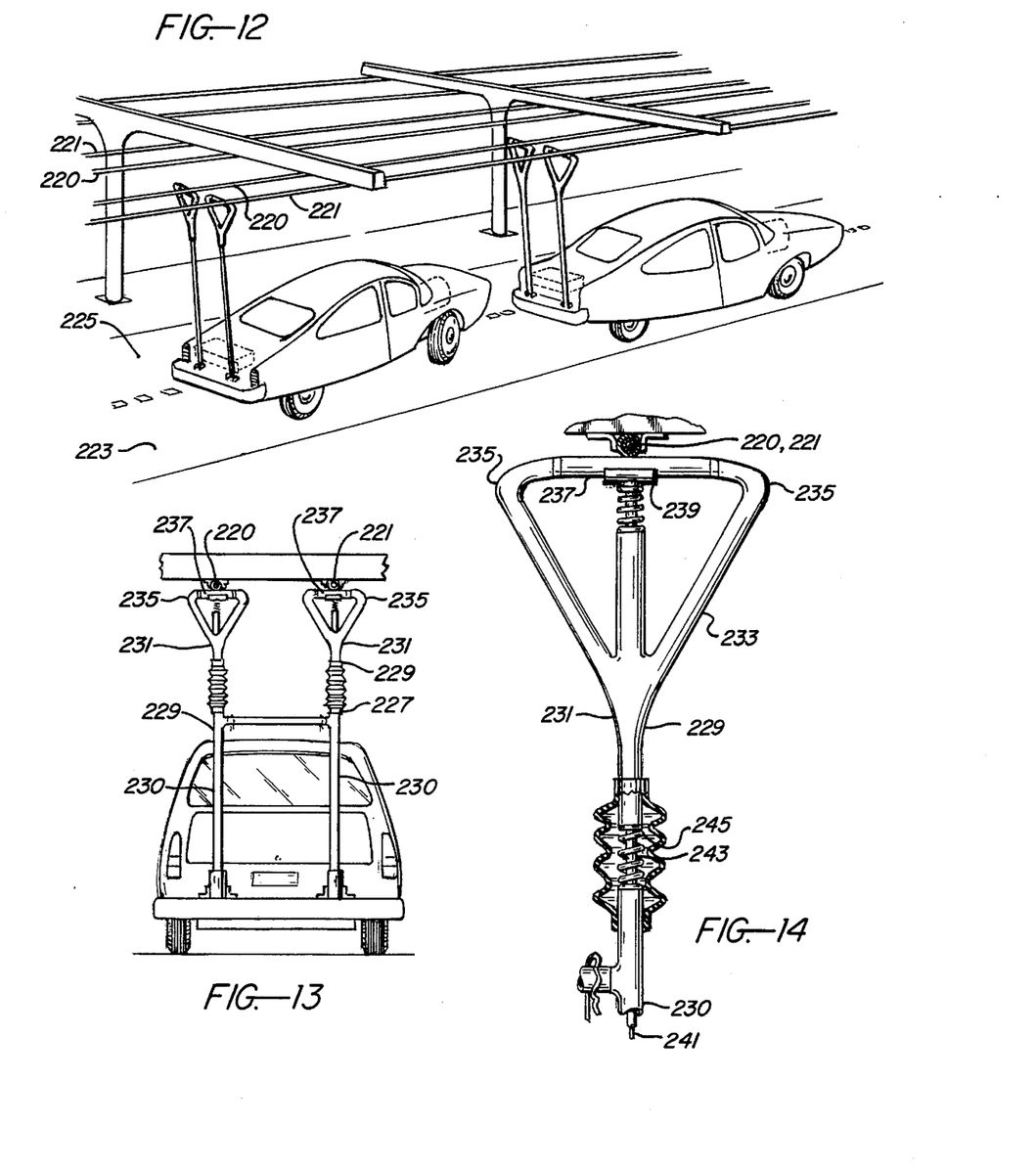
FIG. 12 is a perspective view taken in the direction of FIG. 1 illustrating another system embodying the invention.
FIG. 13 is a rear elevational view of the vehicle of FIG. 12, showing electrical pickup means for transferring electrical power from overhead power supply lines to the vehicle.
FIG. 14 is a fragmentary enlarged view of the pickup means of FIG. 13.

FIG. 12 illustrates a vehicle transportation system according to the invention, comprising stationary conductor means in the form of two pair of overhead rails 220, 221. One rail of each pair is positively charged, while the other rail of each pair is negatively charged. Each pair of rails constitutes a power supply line for supplying power to vehicles traveling in one of the traffic lanes 223, 225. FIG. 12 shows a four lane system having two lanes going in each direction.

Electrical power is transferred from each power supply line to the moving vehicles via electrical pickup structures 227. Each pickup structure comprises an upstanding arm 229 having a lower portion 230 affixed to the vehicle, and an upper portion 231 telescopically connected to the lower arm portion. Each upper arm portion 231 comprises a generally triangular section 233 that forms two convexly curved shoulder members 235 spaced apart to form a mounting structure for a transversely extending roller 237. Each roller constitutes an electrical contact means rollably engageable with overhead rail 220 or 221 for transferring electrical current between the rail and spring-loaded brush means 239. Each roller is electrically insulated from its triangular mounting section 233.

An insulated electrical conductor 241 extends downwardly from each brush means 239 through the telescoped arm portions 231 and 230 for supplying electrical power to the vehicle. The telescopic connection between upper arm portion 231 and lower arm portion 230 includes a rod 243 extending downwardly from arm portion 231 into a tubular section of arm portion 230. A coil spring 245 encircles rod 243 to bias the arm portion 231 upwardly to ensure good electrical contact between roller 237 and the overhead power supply line or rail. The telescopic connection compensates for variations in spacing between the vehicle and the overhead line, whereby the roller has continuous engagement with the overhead line, as long as the vehicle stays within a given traffic lane.

The axial length of each roller 237 is significantly greater than the width dimension of the overhead power line or rail, whereby the vehicle can move a limited distance laterally in a traffic lane, without loss of electrical contact between the rollers and the overhead lines. When the vehicle shifts lanes, e.g., to pass another vehicle in its path, the rollers will necessarily lose contact with the overhead lines. During such times the vehicle will run on battery power and/or momentum. As the vehicle moves toward a centered position in the next traffic lane, the curved shoulder members 235 will cam against the rail surfaces, thus to force the upper portion 233 of each pickup arm to telescope into the lower portion 230 of the arm structure. The curved shoulder members 235 permit the pickup arm structures to move laterally (transversely) from one traffic lane to the other traffic lane without generating interference between either overhead rail and the associated roller type electrical contact 237. Springs 245 ensure good electrical contact between rollers 237 and the respective overhead lines when the vehicle is in a traffic lane.

Figures 15, 16, 17:
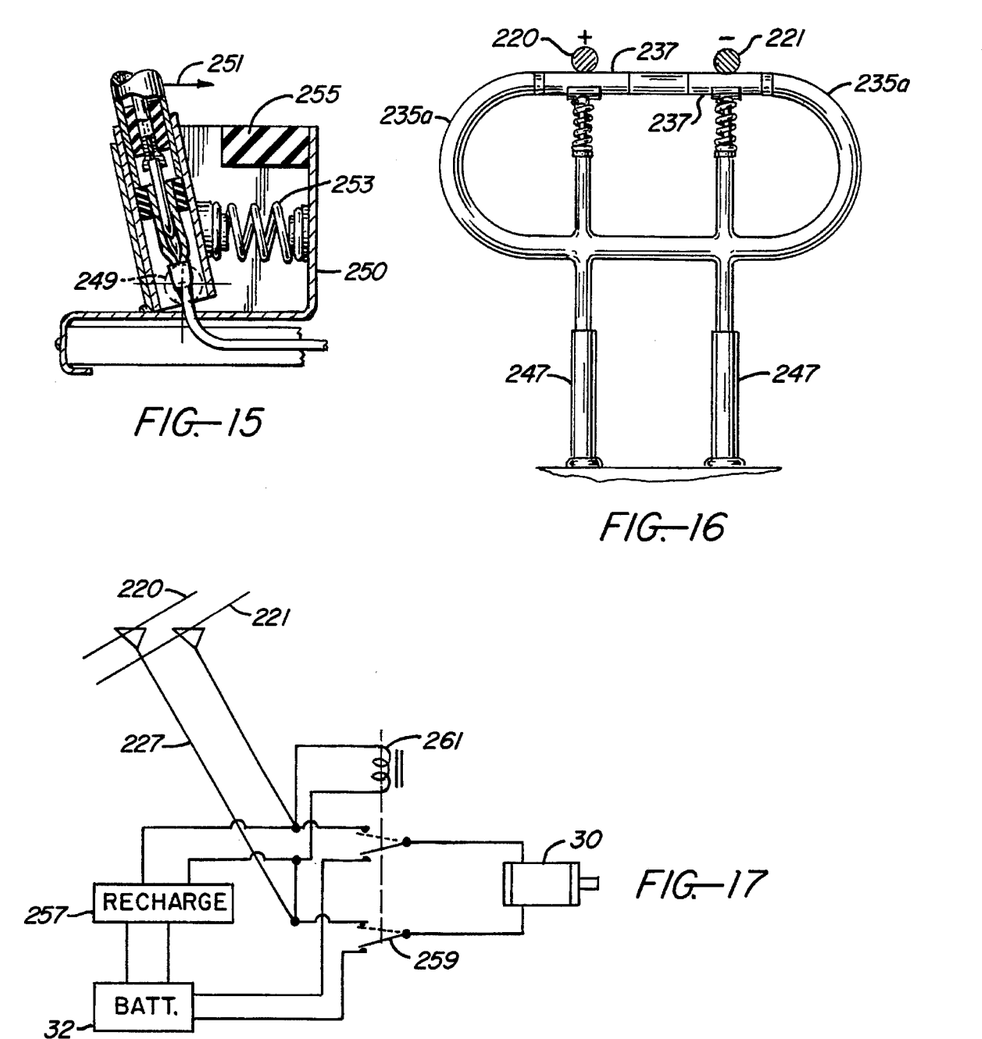
FIG. 15 is a fragmentary view showing swingable pickup arm means that may be utilized with the invention.
FIG. 16 is an elevational view of an alternative form of pickup means usable instead of the pickup means of FIG. 14.
FIGS. 17 and 18 show schematic circuit diagrams for circuitry to provide power to a vehicle propulsion motor in accordance with the invention.

FIG. 16 illustrates a variant of the pickup structure of FIGS. 13 and 14. As shown, the two arm structures are integrated to provide a common mount for the two electrical contact rollers 237. The upper portion of the arm structure includes two curved shoulder members 235a which serve the function of shoulders 235 of the FIG. 14 embodiment. The lower portion of the pickup structure includes two spaced sleeves 247 that telescopically accommodate tubular parts of the upper arm structure. Coil springs (not shown) may be arranged within sleeves 247 to bias the upper arm structure upwardly to ensure good electrical contact between the rollers 237 and the overhead lines.

FIG. 15 fragmentarily illustrates a variant of the invention wherein the electrical pickup means comprises a one piece (non-telescopic) arm structure having a pivotal connection 249 with a mounting means 250 carried by the vehicle, whereby the arm structure can swing in a vertical arc, indicated by arrow 251 in FIG. 15. One or more tension springs 253 are connected between the arm structure and mounting means 250 to bias the arm structure forwardly toward an upright condition. A bumper 255 limits forward motion of the arm structure to an upright condition.

The upper portion of the arm structure may be so constructed, as shown in FIG. 16, that the swinging motion of the arm structure produces an equivalent effect on the telescopic action associated with the structure of FIGS. 13, 14 and 16.

Figure 18:
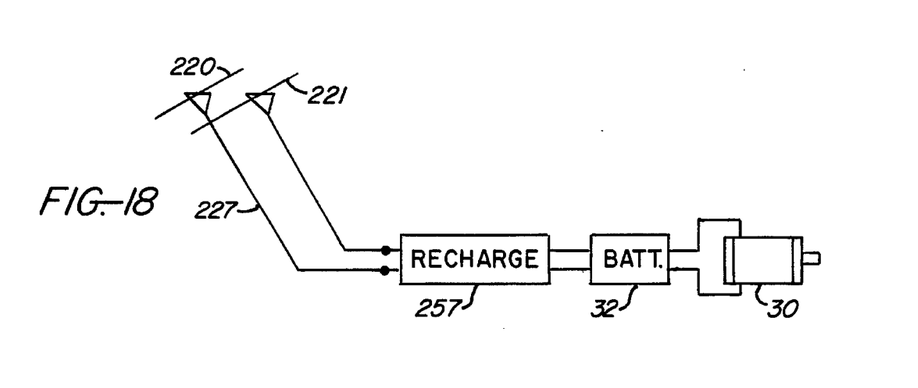

FIGS. 17 and 18 show electric circuits that may be used in each vehicle of the system for supplying electrical energy to the propulsion motor 30. The circuits of FIGS. 17 and 18 are applicable to any of the electrical pickup arrangements shown in FIGS. 2, 4, 7, 8, 9, 11, 13, 15 or 16.

As shown in FIG. 18, electrical energy is supplied by the pickup means 227 to a battery recharging circuit 257 which maintains the battery pack 32 fully charged while the vehicle is traveling on the electrified roadway. With the arrangement of FIG. 18, the propulsion motor means 30 is always running on battery power. The batteries are replenished as long as the pickup means 227 is engaged with the stationary power conductors. While the vehicle is changing traffic lines, the battery means is momentarily cut off from the recharging current source. However, as soon as the vehicle is in the new traffic lane the charging circuit again becomes active to maintain a full charge on the battery.

The system of FIG. 18 requires that the battery be in use for the entire period of vehicle operation on the electrified road system. Because the batteries are a costly component of total vehicle expense, it would be desirable to have a system wherein the vehicle propulsion motor 30 runs on power from the supply lines as much as possible.

FIG. 17 illustrates such a system. The FIG. 17 system includes a set of relay-operated switches 259, such that whenever the pickup means 227 is in contact with the power supply lines 220 and 221, a current path is established between the supply lines and propulsion motor 30. At other times, the relay coil 261 is de-energized so that a current path is established between the battery 32 and the propulsion motor (as shown in FIG. 17). The propulsion motor thus operates mainly on line current. The battery pack is used as the power source only while the vehicle is switching from one traffic lane to another lane.

Various motor energization circuits may be utilized. In one arrangement (not shown) only one set of power lines is required, preferably in the right hand traffic lane (i.e., the non-passing lane). As long as the vehicle is in the non-passing lane, the vehicle will receive power from the stationary power lines associated with that lane. When the vehicle switches into the left hand passing lane to pass another vehicle, battery power may be used to energize the propulsion motor means 30.

I claim:

1. In an electrical vehicle transportation system, the combination comprising:

an electrified roadway having a surface, a traffic lane, and stationary electrical conductor means associated with the roadway within said traffic lane and extending along and coextensive with the roadway, said conductor means comprising a pair of conductive rails extending along said roadway and projecting above said roadway surface, a steerable electrically powered vehicle having wheels riding on said roadway for movement of said vehicle along and laterally of said roadway, electrical pickup means on said vehicle including electrical contact means engaging said conductor means to provide an electrical circuit between said conductor means and said vehicle, said contact means comprising a pair of electrical contacts elongated laterally of said vehicle and engaging said rails, respectively, and wherein said contact means are movable with said vehicle along said conductor means and laterally of said conductor means within certain limits while remaining in continuous electrical contact with said conductor means to permit limited movement of said vehicle laterally of said roadway during movement of the vehicle along the roadway without interruption of said circuit, and said contacts comprise rotary cylindrical contact rollers having normally generally horizontal rotation axes normally extending laterally of said vehicle, said contact rollers comprising cylindrical plastic bodies and metal contact sleeves surrounding said bodies.

2. In an electrical vehicle transportation system, the combination comprising:

an electrified roadway having a surface, a traffic lane, and stationary electrical conductor means associated with the roadway within said traffic lane and extending along and coextensive with the roadway, said conductor means comprising a pair of conductive rails extending along said roadway and projecting above said roadway surface, a steerable electrically powered vehicle having wheels riding on said roadway for movement of said vehicle along and laterally of said roadway, means engaging said conductor means to provide an electrical circuit electrical pickup means on said vehicle including electrical contact between said conductor means and said vehicle, said contact means comprising a pair of electrical contacts elongated laterally of said vehicle and engaging said rails, respectively, and wherein said contact means are movable with said vehicle along said conductor means and laterally of said conductor means within certain limits while remaining in continuous electrical contact with said conductor means to permit limited movement of said vehicle laterally of said roadway during movement of the vehicle along the roadway without interruption of said circuit, and said contacts comprise rotary cylindrical contact rollers having normally generally horizontal rotation axes normally extending laterally of said vehicle, said rotary cylindrical contact rollers having tapered ends to facilitate endwise movement thereof onto said rails laterally of the rails.

3. An electrical vehicle transportation system, comprising:

a roadway having first and second parallel traffic lanes simultaneously accommodating multiple vehicles moving in the same direction, a plurality of steerable vehicles having road wheels riding on said roadway, whereby any vehicle in the system can freely move along either traffic lane or switch from one lane to the other lane, a first power supply line associated with said first traffic lane, and a second power line associated with said second traffic lane, and each vehicle having electrical propulsion motor means, a battery means, and electrical pickup means adapted to electrically connect with either power supply line, said electrical pickup means including contact means having a substantially greater lateral dimension than the associated power line, whereby each vehicle can move laterally within either traffic lane a distance predetermined by said contact means lateral dimension without disengaging the pickup means from the associated power line, whereby said motor means operates on battery power when the pickup means is disengaged from both power supply lines, and said motor means operates on power from the supply lines when the pickup means is engaged with either power supply line.

4. The combination of claim 3, wherein:

each said power line is disposed on the roadway.

5. The combination of claim 3, wherein:

each said power line is disposed in an overhead location above the respective traffic lane.

6. The combination of claim 3, wherein:

said electrical pickup means comprises a horizontal axis roller contact means extending transversely of the direction of the associated power lines, the axial length of said roller contact means being substantially greater than the width dimension of either power line for accommodating limited lateral movement of the vehicle.

7. An electrical vehicle transportation system, comprising:

a roadway having first and second parallel traffic lanes simultaneously accommodating multiple vehicles moving in the same direction, a plurality of steerable vehicles having road wheels riding on said roadway, whereby any vehicle in the system can freely move along either traffic lane or switch from one lane to the other lane, first stationary electrical power supply rail means associated with said first traffic lane for delivering power to vehicles traveling along said first traffic lane, a second stationary rail means associated with said second traffic lane for delivering power to vehicles traveling along said second traffic lane, each rail means comprises a positively charged rail and a negatively charged rail, said rails being spaced laterally apart, each said pickup means comprises laterally spaced contact means extending transversely of the rail means and adapted to engage said rails to transmit current from the rails to the associated vehicle, said contact means having axial lengths that are substantially greater than the width dimensions of the rails, whereby the associated vehicle can move limited distances laterally within either traffic lane without interrupting the electrical connections between the rails and the contact means, each vehicle having electrical propulsion motor means, battery means, battery recharging means, electrical pickup means adapted to electrically connect with either rail means or to move from one rail means to the other rail means, and switch means for connecting said motor means to said pickup means when said pickup means is connected to either rail means, and for connecting said motor means to said battery means when said pickup means is disengaged from either rail means.

8. The combination of claim 7, wherein:

each said rail means is disposed on the roadway.

9. The combination of claim 7, wherein:

each said rail means is disposed in an overhead location above the respective traffic lane.

10. An electrical vehicle transportation system, comprising:

a roadway having first and second parallel traffic lanes simultaneously accommodating multiple vehicles moving in the same direction, a plurality of steerable vehicles having road wheels riding on said roadway, whereby any vehicle in the system can freely move along either traffic lane or switch from one lane to the other lane, first stationary electrical power supply rail means associated with said first traffic lane for delivering power to vehicles traveling along said first traffic lane, a second stationary rail means associated with said second traffic lane for delivering power to vehicles traveling along said second traffic lane, each vehicle having electrical propulsion motor means, battery means in circuit with said motor means for delivering electrical power thereto, and recharging means for supplying recharging current to said battery means, and external electrical pickup means carried by each vehicle in circuit with the associated recharging means, each said electrical pickup means including contact means having a substantially greater lateral dimension than the associated rail means, whereby each vehicle can move laterally within either traffic lane without disengaging the pickup means from the associated rail means, whereby each pickup means is adapted to electrically connect with either rail means or to move from one rail means to the other rail means, whereby each vehicle can freely switch from one lane to the other lane without loss of propulsion power.

11. In an electrical vehicle transportation system, the combination comprising:

an electrified roadway having a surface and at least one traffic lane, stationary electrical conductor means associated with the roadway within said traffic lane, said conductor means extending along coextensively with the roadway, a steerable electrically powered vehicle having wheels riding on said roadway for movement of said vehicle along and transversely of said roadway, and electrical pickup means on said vehicle and including electrical contact means engaging said conductor means to provide an electrical circuit between said conductor means and said vehicle, means supporting the electrical contact means for vertical movement relative to said vehicle, aerodynamic means carried by said supporting means, said aerodynamic means being so oriented that during movement of the vehicle air flows across said aerodynamic means to produce an aerodynamic force during said contact means downwardly against said conductor means, said contact means being movable with aid vehicle along said conductor means and laterally of said conductor means within predetermined limits while in continuous electrical contact with said conductor means to permit limited movement of said vehicle laterally of said roadway without interruption of said electrical circuit.

12. The combination according to claim 11, wherein said aerodynamic means comprises an airfoil.

13. The combination according to claim 11, wherein said aerodynamic means comprises a vane adapted to be impinged upon by air flowing along the vehicle.

14. In an electrical vehicle transportation system, the combination comprising:

an electrified roadway having a surface, a traffic lane, and stationary electrical conductor means associated with the roadway within the traffic lane and extending along and coextensive with the roadway, said electrical conductor means comprising a pair of upwardly opening channels in the roadway, a steerable electrically powered vehicle having wheels riding on said roadway for movement of said vehicle along and laterally of said roadway, electrical pickup means on said vehicle and including electrical contact means engaging said conductors to provide an electrical circuit between said conductor means and said vehicle, said contact means comprising a pair of ball-shaped rollers normally tracking within said channels and being capable of riding upwardly out of said channels, said pickup means further comprising means for mounting the ball-shaped rollers, and a rotary coupling attaching said mounting means to the vehicle, said rotary coupling having a vertical rotation axis forwardly of each associated roller, whereby the coupling can swivel about the vertical rotation axis to lead the associated roller into or out of a respective channel, said rotary coupling and associated mounting means enabling said ball-shaped rollers to maintain continuous electrical contact with said channels while the vehicle is undergoing limited movement laterally of the roadway, thus to prevent interruption of said electrical circuit.

15. In an electrical vehicle transportation system, the combination comprising:

an electrified roadway having a surface, a traffic lane, and a stationary electrical conductor means associated with the roadway within said traffic lane and extending along and coextensive with the roadway, said conductor means comprising a pair of conductors fixed within a pair of upwardly opening channels, respectively, in and extending along the roadway, a steerable electrically powered vehicle having wheels riding on said roadway for movement of said vehicle along and laterally of said roadway, electrical pickup means on said vehicle including electrical contact means engaging said conductor means to provide an electrical circuit between said conductor means and said vehicle, said contact means comprising at least one pair of contacts engageable within said channels, respectively, and with the respective conductors, and movable into and out of the channels laterally of the channels, and wherein said contact means are movable with said vehicle along said conductor means and laterally of said conductor means within certain limits while remaining in continuous electrical contact with said conductor means to permit limited movement of said vehicle laterally of said roadway during movement of the vehicle along the roadway without interruption of said circuit.

16. The combination according to claim 15, wherein:

said contact rollers have cylindrical contact portions engaging the respective rails, and raised tire-like portions circumferentially surrounding the ends of said cylindrical contact portions.

17. The combination according to claim 15, wherein:

said contact means comprises at least four contacts including a first pair of contacts associated with said channels, respectively, and a second pair of contacts associated with said channels, respectively, and the spacing between the contacts of each contact pair equals the spacing between said roadway channels, whereby movement of said vehicle laterally of said roadway with the contacts of one contact pair initially positioned within said channels and in a direction to move the other pair of contacts toward their respective channels effects lateral movement of the contacts of said one contact pair from said channels and lateral entrance of the contacts of said other contact pair into said channels without prolonged interruption of said circuit.

18. The combination according to claim 17, wherein:

said channels have upwardly divergent confronting sides, each conductor has spaced opposing portions along said confronting sides of the respective channel, said opposing conductor portions are rounded and disposed along said diverging channel sides, and said contacts comprise generally ball-shaped rotary contact wheels having spherical contact portions engageable between and with the respective opposing conductor portions.

19. The combination according to claim 15, wherein:

said channels have upwardly divergent confronting sides, each conductor has spaced opposing portions along said confronting sides of the respective channel, and said contacts comprise generally ball-shaped rotary contact wheels having spherical contact portions engageable between and with the respective opposing conductor portions.

20. In an electrical vehicle transportation system, the combination comprising:

an electrified roadway having a surface, two lanes for traffic in the same direction, and a stationary electrical conductor means associated with the roadway within said traffic lane and extending along and coextensive with the roadway, said conductor means comprising electrified rail means in an overhead location relative to the traffic lane, a steerable electrically powered vehicle having wheels riding on said roadway for movement of said vehicle along and laterally of said roadway, electrical pickup means on said vehicle including electrical contact means engaging said conductor means to provide an electrical circuit between said conductor means and said vehicle, said pickup means comprising an arm structure extending upwardly from the vehicle, said arm structure comprising two shoulder members spaced apart and having cam surfaces, said electrical contact means comprising two laterally spaced rollers extending transversely of the conductor means, said rollers being adapted to maintain rolling contact on said rail means to transmit current to the electrical vehicle, said rollers having predetermined lengths substantially greater than the width dimensions of the rail, whereby the vehicle is movable from one of said traffic lanes to the other of said traffic lanes with only momentary interruption in flow of electrical power to the vehicle, said shoulder members being adapted to shift laterally across said rail means when the vehicle is steered laterally of said roadway to a point where the roller is out of engagement with the rail means, and said contact means are movable with said vehicle along said conductor means and laterally of said conductor means within certain limits predetermined by said length of the contact means, while remaining in substantially continuous electrical contact with said conductor means to permit limited movement of said vehicle laterally of said roadway during movement of the vehicle along the roadway without interruption of said circuit.

* * * * *